(12) United States Patent
Oltean et al.

(10) Patent No.: US 10,558,565 B2
(45) Date of Patent: Feb. 11, 2020

(54) GARBAGE COLLECTION IMPLEMENTING ERASURE CODING

(71) Applicant: Microsoft Technology Licensing, LLC, Redmond, WA (US)

(72) Inventors: Ioan Oltean, Redmond, WA (US); Rushi Srinivas Surla, Kenmore, WA (US); Jegan Devaraju, Redmond, WA (US); Maneesh Sah, Sammamish, WA (US); Julia Johnstone, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/990,969

(22) Filed: May 29, 2018

(65) Prior Publication Data

US 2019/0370170 A1 Dec. 5, 2019

(51) Int. Cl.
*G06F 3/00* (2006.01)
*G06F 12/02* (2006.01)
*G06F 3/06* (2006.01)
*G06F 11/10* (2006.01)

(52) U.S. Cl.
CPC ........ *G06F 12/0253* (2013.01); *G06F 3/0604* (2013.01); *G06F 3/064* (2013.01); *G06F 3/065* (2013.01); *G06F 3/067* (2013.01); *G06F 3/0608* (2013.01); *G06F 11/1088* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| 8,412,979 | B2 | 4/2013 | Flynn et al. |
| 9,525,737 | B2 | 12/2016 | Friedman |
| 2012/0266050 | A1 | 10/2012 | Cideciyan et al. |
| 2016/0179410 | A1 | 6/2016 | Haas et al. |

OTHER PUBLICATIONS

"International Search Report and Written Opinion Issued in PCT Patent Application No. PCT/US2019/031933", dated Sep. 18, 2019, 14 Pages.

*Primary Examiner* — Midys Rojas
(74) *Attorney, Agent, or Firm* — Buckley, Maschoff & Talwalkar LLC

(57) ABSTRACT

Provided is a system and method for converting active data identified by a garbage collection operation into erasure coded fragments. In one example, the method may include identifying data blocks in use and interspersed among garbage data blocks not in use in cloud storage based on a garbage collection operation, extracting object data from the identified data blocks in use into a data container while leaving object data of the garbage data blocks not in use, and fragmenting a predetermined amount of extracted object data stored within the data container, the fragmenting comprising converting the predetermined amount of object data into a plurality of fragments including data fragments storing portions of the data and parity fragments for reconstructing the data, and writing the plurality of fragments in a distributed manner among a plurality of storage nodes.

20 Claims, 7 Drawing Sheets

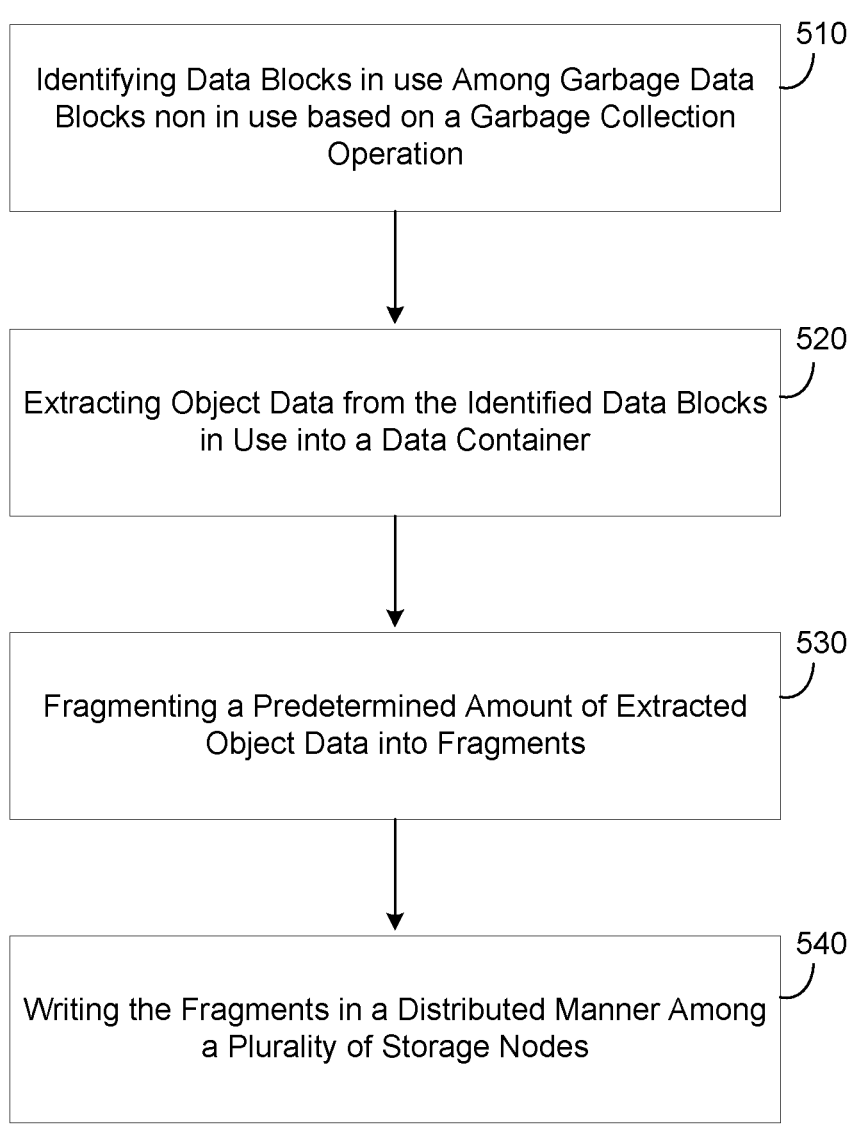

GARBAGE COLLECTION IMPLEMENTING ERASURE CODING

BACKGROUND

Cloud storage enables data to be stored on the Internet at a remote storage site rather than, or in addition to storing data on-premises. Cloud storage typically refers to a hosted object storage service. In some cases, cloud storage may offer a massively scalable object store for data objects, a file system service for the cloud, a messaging store for reliable messaging, and the like. Redundancy within cloud storage is used ensure that data is safe in the event of transient hardware failures. Data may be replicated across datacenters or geographical regions of the cloud storage for additional protection. Data that is written to cloud storage may also be encrypted to ensure security. Cloud storage may provide fine-grained control over who has access to data. In addition, providers may handle maintenance and any critical problems that occur with the cloud storage and its services thereby alleviating clients from such tasks. Cloud storage is also accessible on a global basis making access to data more convenient.

Cloud storage may include a layered storage architecture that uses, at its lowest layer, large append-only files which can be referred to as "extents." The extents are often replicated (e.g., three-way replicated, etc.) across multiple storage nodes for data durability. Multiple user blobs of arbitrary size may be collocated in the same extent, another common technique designed to maximize the bandwidth of the underlying storage media. As blobs are deleted and/or overwritten by a user, the blobs no longer in use leave holes of unused space within the extent. Because extents are append-only, the holes are unusable space until the entire extent is reclaimed by a garbage collection background job that gathers blobs still in use from an extent and re-writes them into a new extent. The garbage collection process then returns the old extent back into a pool where it can be re-used for storage.

One of the requirements of cloud storage is to ensure data durability. Accordingly, the new extent is replicated across multiple nodes to account for the event of failure at one node. Furthermore, the replicated extent is a temporary state because when the extent fills up, the extent then receives additional processing such as erasure coding and the extent is deleted. However, this replication process consumes network resources and requires the cloud to redundantly store the same extent on multiple servers. Accordingly, what is needed is an improved process for durable storage of in use data collected through garbage collection.

BRIEF DESCRIPTION OF THE DRAWINGS

FIG. 5 is a diagram illustrating a method for garbage collection and erasure coding according to some embodiments.

DETAILED DESCRIPTION

The following description is provided to enable any person in the art to make and use the described embodiments. Various modifications, however, will remain readily-apparent to those in the art.

In cloud storage, garbage collection is a process which reclaims storage that includes both data in use (good data) and data no longer in use (garbage). Within the cloud storage, the garbage collection operation may identify the good data within a data container (e.g., extents, etc.) interspersed with garbage data in the container. The identified data may be labeled and sent to an stream manager which causes the system to collect the good data, create a new data container with the good data, and replicate the data container across multiple nodes for data durability. For example, the garbage collection may create three replicas to ensure data durability. One or more of the replicas may be subsequently erasure coded and the three replicas are then deleted. Meanwhile, the old data container that is left with garbage is cleared and reclaimed by sending it back into a pool of usable data containers. However, the replication process creates redundant copies of the same extent data container which are then deleted and no longer useful resulting in unnecessary (wasteful) consumption of storage (disk), unnecessary consumption of network resources, and the like. The example embodiments improve upon this wasteful use of resources by creating a more efficient erasure coding process.

The example embodiments improve upon the garbage collection process by removing the data replication process and converting the good data identified by the garbage collection operation directly into erasure coded data. A stream layer of the cloud storage system implements an application programming interface (API) that takes a list of good data objects and returns an erasure coded extent that is built from the list of objects. Here, the stream layer may be implemented by an extent node performing the data collection and erasure coding. The good data objects may be identified from a list of good data tuples that includes an identification of an extent, an offset, and a size of the object. The list may be provided from a stream manager of the stream layer When an extent node has collected enough data to reach a predetermined threshold of data within the data container, the extent node may perform erasure coding on the predetermined threshold of good data to generate a plurality of fragments. For example, the erasure coding may create a plurality of data fragments containing the object data, and a plurality of parity fragments which include instructions and properties for recovering the entire threshold of good data being erasure coded in case one or more of the data fragments are lost. The extent node may distribute the fragments across a plurality of server nodes (e.g., extent nodes) thereby achieving data durability without having to replicate an extent.

Figure 1:
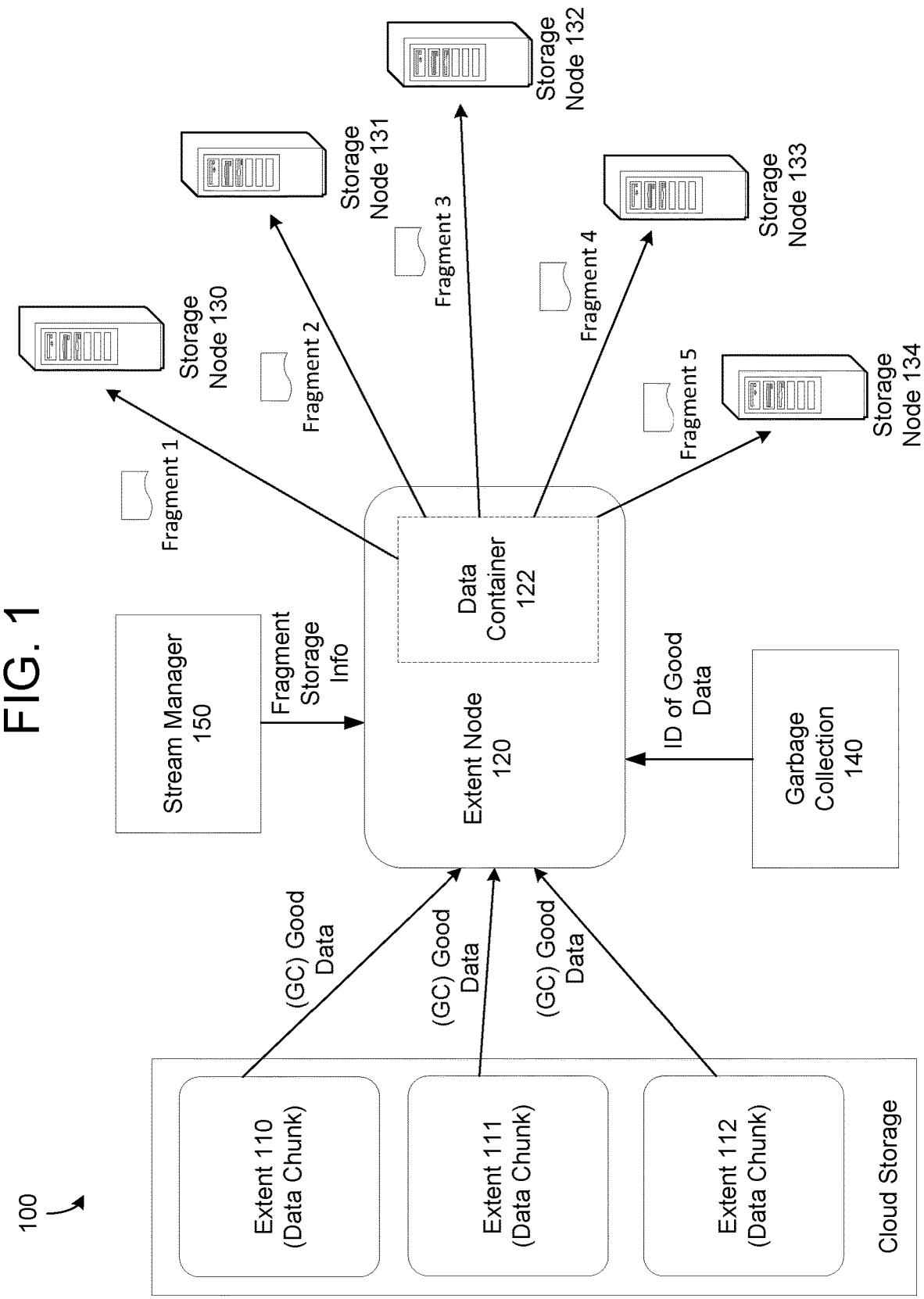
FIG. 1 is diagram illustrating a garbage collection process implementing erasure coding according to some embodiments.

FIG. 1 illustrates a garbage collection system 100 implementing erasure coding according to some embodiments. Here, the garbage collection system 100 may be implemented within a cloud platform storage environment including multiple extent nodes storing extents. Referring to FIG.

1, the system 100 includes an extent node 120 performing erasure coding. A garbage collection process 140 performs garbage collection on extent data chunks 110-112 to identify data blocks within extent data chunks 110-112 that are in use and which are to be retained. Here, each extent data chunk 110-112 may reside on a respective extent node. After it identifies the good data, the garbage collection process 140 may provide the extent node 120 with a listing of data objects that are to be retained. For example, the data objects in use may be identified by an extent ID, an offset, and a size. The extent node 120 may retrieve the good data objects in use from the extent data chunks 110-112 and store the good data objects in a data container 122. Here, the data container 122 may be the same size as an extent data chunk, but is not limited thereto.

The system 100 also includes a stream manager 150 which manages extent nodes within the cloud platform. The stream manager 150 can provide an erasure coding scheme to the extent node 120. The erasure coding scheme can identify fragmentation information for generating a plurality of erasure coded fragments, and a scheme for distributing and writing the fragments across different extent nodes 130-134. One example erasure coding scheme breaks-up a data container 122 of data objects into six (6) data fragments and also generates three (3) parity fragments for recovering the data in case any of the six data fragments are lost. In this example, the erasure coding scheme may identify what data is put into each fragment. Furthermore, the erasure coding scheme may identify where each fragment is to be stored. As one example, the six data fragments and the three parity fragments may be stored across nine (9) server nodes for maximum data durability, however, embodiments are not limited thereto. As another example, one or more nodes may store multiple fragments.

By performing erasure coding on garbage collected data still in use, the system 100 can significantly improve both the amount of disk space needed for durability and network resources consumed between extent nodes and the stream manger 150 during data replication. Furthermore, the extent data chunks 110-112 may be returned to a pool of usable storage as a result of the garbage collection process 140.

Figure 2:
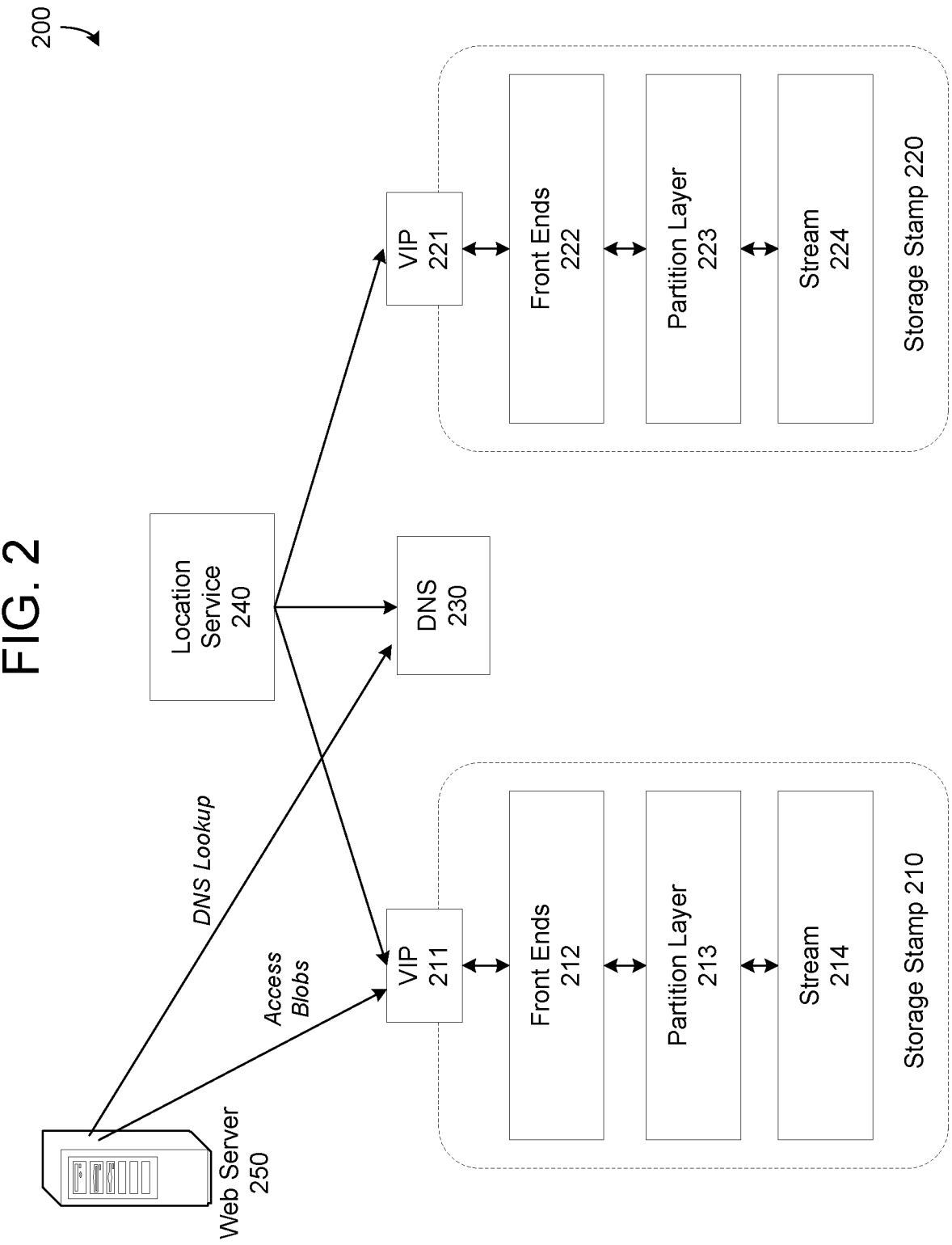
FIG. 2 is a diagram illustrating an object storage architecture for a cloud environment according to some embodiments.

FIG. 2 illustrates an object storage architecture 200 for a cloud environment according to some embodiments. For example, the cloud platform 120 shown in FIG. 1 may be included within a larger architecture such as architecture 200 shown in FIG. 2. Referring to FIG. 2, the architecture 200 includes a plurality of storage stamps (e.g., 210 and 220, etc.) which may be accessed by a server 250 (via a client, etc.) The number of storage stamps is not limited to two but may be more or less. The storage stamps 210 and 220 may each include a front-end 212 and 222, respectively, a partition layer or storage 213 and 223, respectively, and a stream layer 214 and 224, respectively. For convenience, the first storage stamp 210 may be described for purposes of example, but the features thereof may be applied to any storage stamps within the architecture 200 which may include one storage stamp, more than one storage stamp, and the like. The domain name server (DNS) 230 may maintain a directory of domains based on accounts, partitions, objects, and/or the like.

When accessing the storage stamp 210, the web server 250 may provide an account name selected by the customer for accessing storage and is part of a DNS 230 host name. The account name DNS 230 translation may be used to locate a primary storage cluster and data center where the data is stored. The primary location is where all requests go to reach the data for that account. An application may use multiple account names to store its data across different locations. In conjunction with the account name, the partition name locates the data once a request reaches the storage cluster. The partition name is used to scale out access to the data across storage nodes based on traffic needs. When a partition name holds many objects, an object name identifies individual objects within that partition. The system may support atomic transactions across objects with the same partition name value. The object name may be optional since, for some types of data, the partition name uniquely identifies the object within the account.

Referring to FIG. 2, the storage stamp 210 may include a cluster of N racks of storage nodes, where each rack is built out as a separate fault domain with redundant networking and power. The storage stamp 210 may have its own virtual IP address (VIP 211). Clusters may range from 10 to 20 racks with 18 disk-heavy storage nodes per rack, but embodiments are not limited thereto. The location service 240 may manage the storage stamps. The location service 240 may be responsible for managing the account namespace across all stamps. The location server 240 may allocate accounts to storage stamps and manages them across the storage stamps for disaster recovery and load balancing. The location service 240 itself may be distributed across more than one geographic locations for its own disaster recovery.

The stream layer 214 may store the bits on disk and is in charge of distributing and replicating the data across many servers to keep data durable within the storage stamp 210. The stream layer 214 can be a distributed file system layer within a stamp. The stream layer 214 understands extents, referred to as streams which are ordered lists of large storage chunks referred to as extents, how to store extents, how to replicate extents, and the like, but the stream layer 210 may not understand higher level object constructs or their semantics. The data is stored in the stream layer 214, but it is accessible from the partition layer 213. For example, partition servers (daemon processes in the partition layer 213) and stream servers may be co-located on each storage node in a stamp.

The partition layer 213 is built for (a) managing and understanding higher level data abstractions (blob, table, queue), (b) providing a scalable object namespace, (c) providing transaction ordering and strong consistency for objects, (d) storing object data on top of the stream layer, and (e) caching object data to reduce disk I/O. Another responsibility of the partition layer 213 is to achieve scalability by partitioning all of the data objects within a stamp. As described earlier, all objects have a partition name and may be broken down into disjointed ranges based on the partition name values and served by different partition servers. The partition layer 213 manages which partition server is serving what partition name ranges for blobs, tables, and queues. In addition, the partition layer 213 provides automatic load balancing of partition names across the partition servers to meet the traffic needs of the objects.

The front-end (FE) layer 212 may include a set of stateless servers that take incoming requests from web server 250. Upon receiving a request, the front end layer 212 may look up the account name, authenticate and authorize the request, and route the request to a partition server in the partition layer 213 (based on the partition name). The system may maintain a partition map that keeps track of the partition name ranges and which partition server is serving which partition names. For example, an FE server may cache the partition map and use the partition map to determine which partition server to forward each request to. The FE server may also stream large objects directly from the stream layer 214 and cache frequently accessed data for efficiency.

Figure 3A:
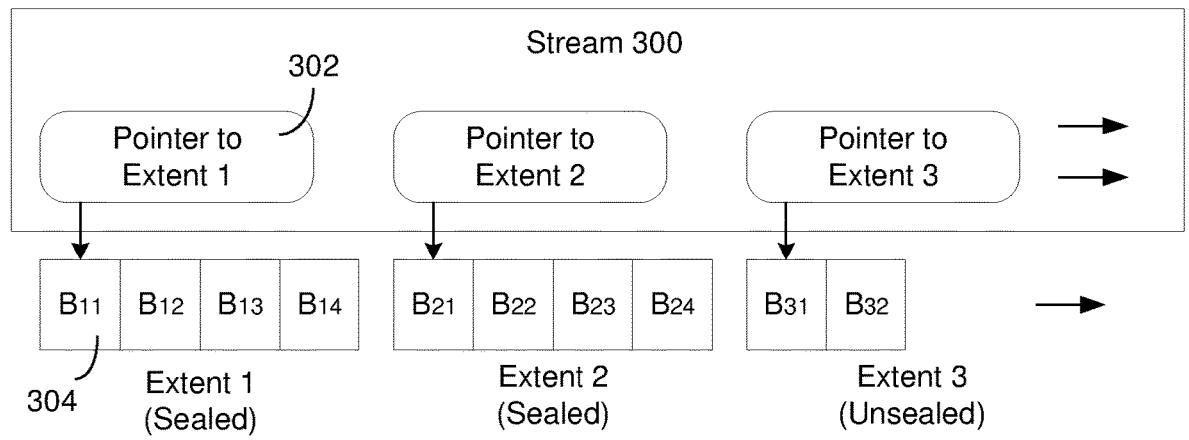
FIGS. 3A-3B are diagrams of a stream layer and a stream architecture of cloud storage according to some embodiments.
Figure 3B:
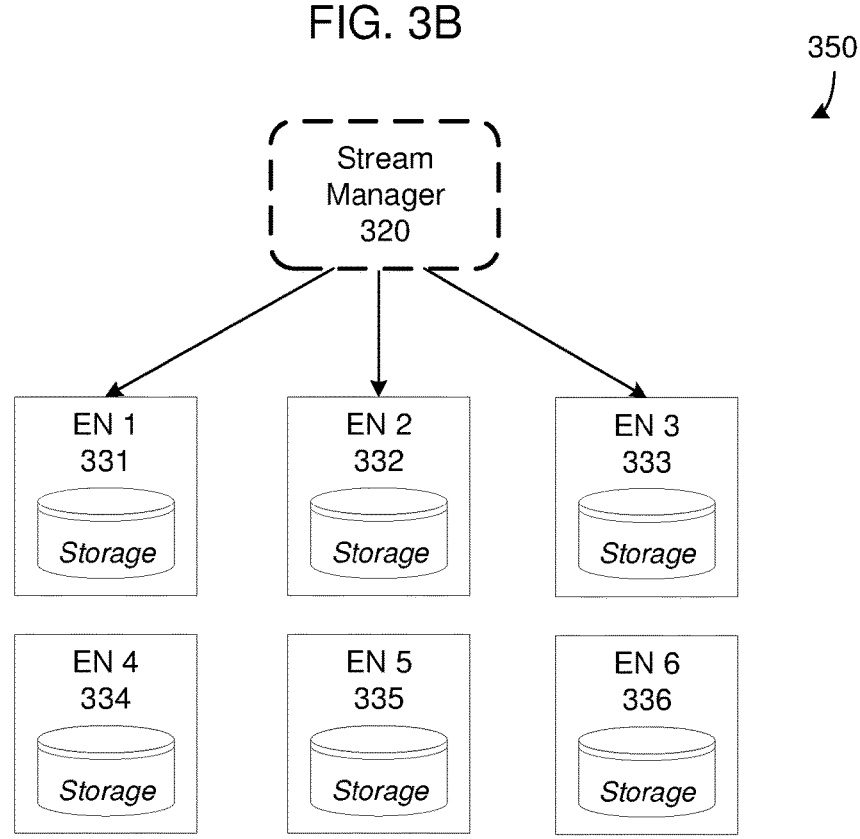

FIG. 3A illustrates an example of a stream 300 according to some embodiments, and FIG. 3B illustrates a stream architecture 350 of cloud storage according to some embodiments. The stream layer 214 shown in FIG. 2 provides an internal interface used only by the partition layer. The stream layer 214 may provide a file system like namespace and an API, where all writes may be append-only. The stream layer 214 allows clients (the partition layer) to open, close, delete, rename, read, append to, and concatenate large files, referred to as streams. Referring to FIG. 3, the stream 300 managed within stream layer 214 is an ordered list of extent pointers 302, and an extent is a sequence of append blocks 304. In the example of FIG. 3, the stream 300 includes pointers to three extents (E1, E2, and E3) but obviously may include more not shown. Each extent contains a set of blocks 304 that were appended to it. In this example, extents E1 and E2 are sealed extents meaning that blocks may no longer be appended. The next extent in the stream 300 available is extent E3 which can receive appended blocks. In this example, if an application reads the data of the stream 300 from beginning to end, it would get the block contents of the extents in the order of E1, E2, E3, etc.

The block 304 may be a minimum unit of data for writing and reading. A block can be up to N bytes (e.g., 4 MB, etc.). Data is written (appended) as one or more concatenated blocks to an extent, where blocks do not have to be the same size. The client does an append in terms of blocks and controls the size of each block. A client read gives an offset to a stream or extent, and the stream layer reads as many blocks as needed at the offset to fulfill the length of the read. When performing a read, the entire contents of a block are read. This is because the stream layer stores its checksum validation at the block level, one checksum per block. The whole block may be read to perform the checksum validation, and it is checked on every block read.

Extent are the unit of replication in the stream layer, and the default replication policy may be to keep three replicas within a storage stamp for an extent, however, embodiments are not limited thereto. Each extent may be stored in an NTFS file and include a sequence of blocks. A target extent size used by the partition layer may be 1 GB but is not limited thereto and may be different among different extents. To store small objects, the partition layer appends many of them to the same extent and even in the same block. As another example, to store large TB-sized objects (blobs), the object may be broken up over many extents by the partition layer. The partition layer keeps track of what streams, extents, and byte offsets in the extents in which objects are stored as part of its index.

Each stream may have a name the hierarchical namespace maintained at the stream layer 214, and a stream looks like a big file to the partition layer. Streams are appended to and can be randomly read from. A stream is an ordered list of pointers to extents which is maintained by the Stream Manager. When the extents are concatenated together they represent the full contiguous address space in which the stream can be read in the order they were added to the stream. A new stream can be constructed by concatenating extents from existing streams, which is a fast operation since it just updates a list of pointers. Only the last extent in the stream can be appended to. All of the prior extents in the stream are immutable Referring to FIG. 3B, the stream architecture 350 includes a stream manager 320 and a plurality of extent nodes 331-336. The stream manager 320 may keep track of the stream namespace, what extents are in each stream, and the extent allocation across the extent nodes (ENs) 331-336. The stream manager 320 may be a Paxos cluster that is off the critical path of client requests. The stream manager 320 is responsible for (a) maintaining the stream namespace and state of all active streams and extents, (b) monitoring the health of the ENs 331-336, (c) creating and assigning extents to ENs, (d) performing the lazy re-replication of extent replicas that are lost due to hardware failures or unavailability, (e) garbage collecting extents that are no longer pointed to by any stream, and (f) scheduling the erasure coding of extent data according to stream policy.

The stream manager 320 may periodically poll (syncs) the state of the ENs 331-336 and what extents are being stored at the ENs 331-336. If the stream manager 320 discovers that an extent is replicated on fewer than the expected number of ENs, a re-replication of the extent will lazily be created by the SM to regain the desired level of replication. For extent replica placement and fragment placement for erasure coding, the stream manager 320 may randomly chooses ENs across different fault domains, so that they are stored on nodes that will not have correlated failures due to power, network, or being on the same rack. The client of the stream layer is the partition layer, and the partition layer and stream layer may be co-designed to limit the use of extents and streams for a single storage.

Each extent node 331-336 may maintain a storage for a set of extent replicas assigned thereto by the stream manager 320. An EN may include N disks attached, which are controlled by the EN for storing extent replicas and their blocks. An EN may not be aware of streams, but instead may be knowledge of extents and blocks. Internally on an EN server, every extent on disk is a file, which holds data blocks and their checksums, and an index which maps extent offsets to blocks and their file location. Each extent node contains a view about the extents it owns and where the peer replicas are for a given extent. This view is a cache kept by the EN of the global state the SM keeps. ENs only talk to other ENs to replicate block writes (appends) sent by a client, or to create additional copies of an existing replica when told to by the SM. When an extent is no longer referenced by any stream, the stream manager 320 may garbage collects the extent and notifies the ENs to reclaim the space according to various embodiments.

Figure 4A:
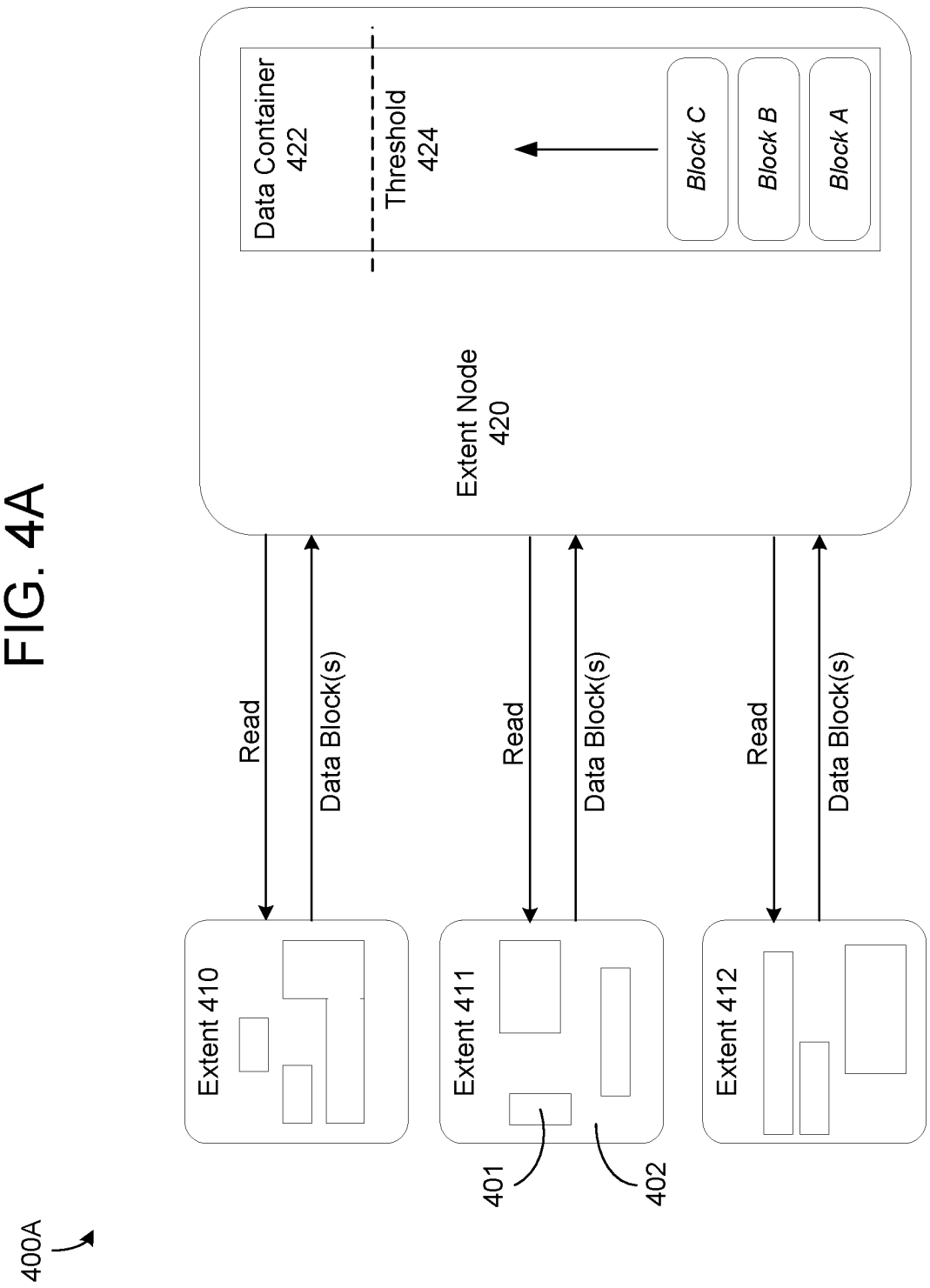
FIGS. 4A-4B are diagrams illustrating a process of reading and fragmenting data in use among a plurality of server nodes according to some embodiments.
Figure 4B:
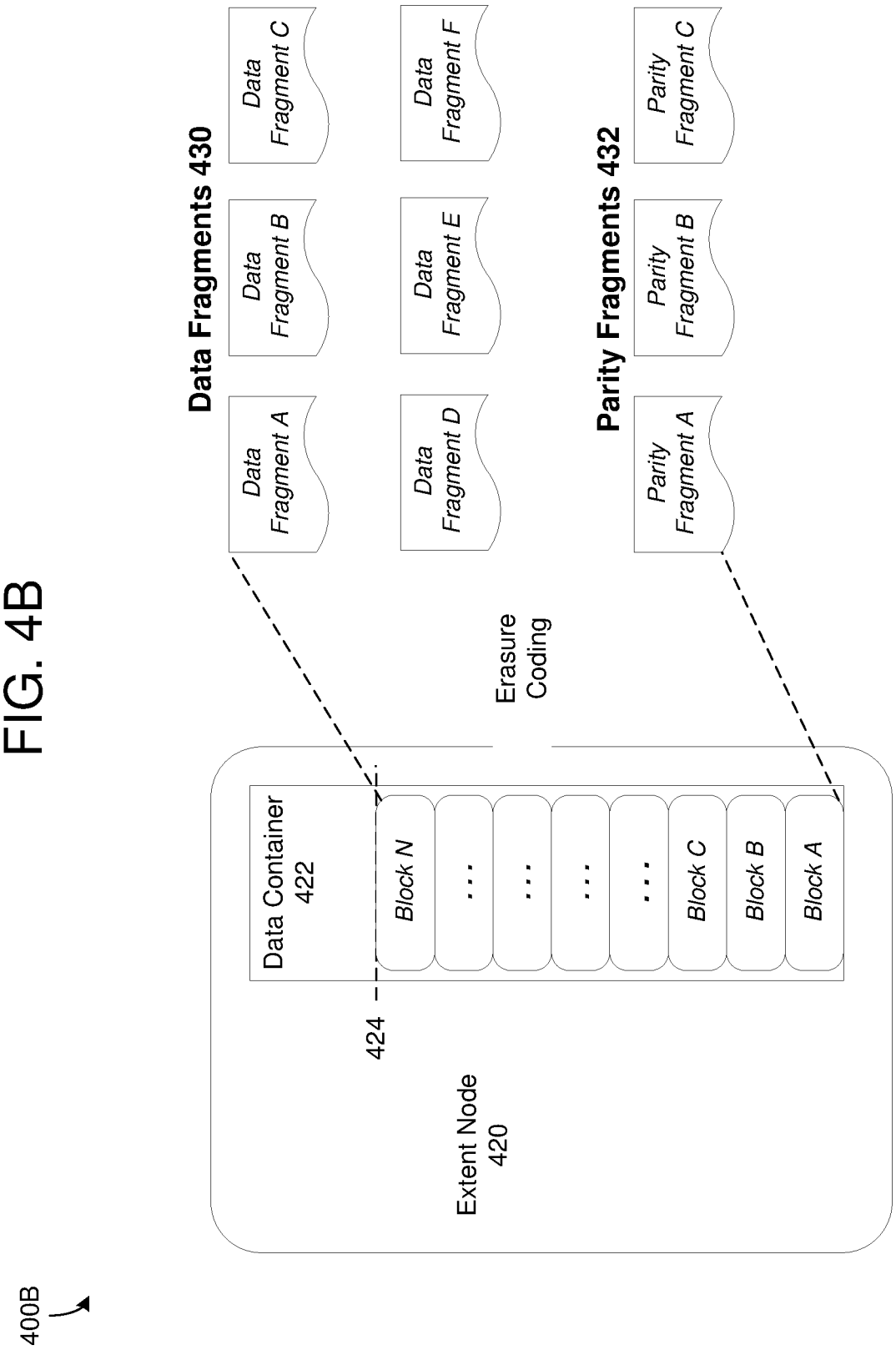

FIGS. 4A-4B illustrate a processes 400A and 400B of reading and fragmenting data among a plurality of server nodes according to some embodiments. In some embodiments, the processes 400A-400B may be referred to as a write-gather process. Referring to FIG. 4A, in process 400A, an extent node 420 collects good data that is identified by a garbage collection operation from extents 411-413. For example, an identified of the good data may be supplied by a client, by a stream manager (e.g., stream manager 320 in FIG. 3B), by a garbage collection operation (e.g., garbage collection 140 in FIG. 1), or the like. The good data may be identified via a list of append blocks (pairs of <Extent Id, Offset, Size>) to gather data from. In some cases, a client application may decide how many append blocks to admit into a new extent based on a desired extent file length (logical and physical). As another example, the size may be set by the extent node, stream manager, or the like. In the example of FIG. 4A, the extent node may continue to retrieve data blocks 401 that are still good interspersed among data blocks 402 that are no longer in use (e.g., deleted, overwritten, etc.) from extents 410-412 until a predetermined threshold 424 of data is retrieved at which point an erasure coding operation may be performed (e.g., FIG. 4B).

Data blocks may be read or otherwise extracted by the extent node 420 from the extents 410-412 which include good data interspersed among data no longer in use. The list of append blocks added to data container 422, including their compressed size, may be added to a durable storage. Persisting the list of append blocks to a durable storage makes the write-gather extent operation resilient to failures of the extent node 422. For example, another extent node could pick up the write-gather job and continue from where the previous one left off.

Referring to FIG. 4B, when enough data blocks have been added to the data container 422 to achieve the predetermined threshold of data 424, the extent node may perform erasure coding to generate data fragments 430 and parity fragments 432 based on the object data stored within the data blocks of the data container 422. For example, the stream manager may create the extent, determine locations of other extent nodes where fragment copies are to be stored, and initiate the erasure coding by submitting a request to the extent node 420 thereby coordinating the erasure coding process. The extent node 420 may retrieve the list of append blocks and initiate the erasure coding by reading data from the source extents, encoding it and writing the data fragments 430 and the parity fragments 432 to target extent nodes identified by the stream manager. This part of the process may share and reuse a significant portion of the code paths from a lazy erasure coding process. Furthermore, the extent node 420 may update the stream manger with a state of the extent fragments. Upon successful/error completion of the erasure coding, the stream manager may mark the extent as sealed and notify the garbage collection operation.

In some embodiments, throttling may be performed to control how much resources are allocated to the garbage collection/erasure coding process 400A and 400B by background maintenance jobs such as partition GC. The latency of the operation may be less important than the bandwidth. To achieve greater bandwidth, the user/client may submit many write-gather extent requests simultaneously while setting the I/O priority to Low. The combination of the greater requests and lower priority allows stream layer to optimize resource (disk) access. The stream layer may allocate idle resources and arbitrate access to resources where write-gather traffic contends with user traffic. If a background job falls behind (e.g., GC not being able to keep up with data ingestion rates for example), the priority of the new requests may be temporarily raised. Once the background job has caught up the priority may be reverted back to low priority.

The stream manager (e.g., stream manger 320 shown in FIG. 3) may create the extent, sets appropriate flags (such as sealed, unsealed, being gather-collected, etc.), place fragment copies and send initiate write-gather extent requests to the coding extent node. The stream manager may also monitor the state of the fragment instances and create new instances to replace failed ones. The stream manager may monitors the state of the coding extent node and designate a new coding extent node to replace the failed one by sending it a new initiate write-gather extent request. The stream manager marks the extent as sealed when all fragments are completed. Furthermore, the stream manager may maintain a reference to the write-gather extent until the operation fails or the operation completes successfully but the extent is abandoned (not used by the client within a certain time interval). The presence of a write-gather extent flag may indicate that the stream manager has a reference count to that extent.

In some embodiments, the stream manager may deletes old input streams. Old input streams are the streams that contain the list of append blocks provided by the client when it initiated the write-gather operation. The streams should be kept past the completion of the write-gather for debugging purpose. In some embodiments, the stream manager may manage an API that can be used to display the list of write-gather extents (extents with write-gather flag) and input streams. In some embodiments, the stream manager may also publish write-gather extent metrics to the monitoring pipeline (number of operations, total extent logical and compressed size, completion times, etc.)

FIG. 5 illustrates a method 500 a method for garbage collection and erasure coding according to some embodiments. For example, a processing unit (e.g., one or more processors, processing cores, processor threads, etc.) of a data server (e.g., cloud server node, extent node, etc.) may execute software program code to cause a data server to perform the method 500. For example, the method 500 and all other methods and processes herein may be embodied in computer-executable program code that may be read from one or more non-transitory computer-readable media, such as a flash drive, a CD-ROM, a DVD-ROM, an external disk, a magnetic tape, or the like, and then stored in a compressed, uncompiled and/or encrypted format. In some embodiments, hard-wired circuitry may be used instead of, or in combination with program code to implement the methods and processes. Embodiments are not limited to any specific combination of hardware and software.

Referring to FIG. 5, in 510, the method may include identifying data blocks in use and interspersed among garbage data blocks not in use in cloud storage based on a garbage collection operation, and in 520, extracting object data from the identified data blocks in use into a data container while leaving object data of the garbage data blocks not in use. For example, the extent node may receive a list of good data blocks from a garbage collection process which identifies good data blocks with an identification of an extent (data chunk), an offset of the data block, and a size. Accordingly, the extent node can identify and retrieve good data blocks from extents to build a new data block that is garbage-free. The data collected from extents may be associated with different clients and different extent nodes. By collecting the good data from data containers that also garbage data blocks, the collection process can compact good data, empty the old data containers with only garbage remaining, and return the data container back to a pool of usable data containers.

In some embodiments, the data blocks in use may include active object data, and the garbage data blocks not in use may include deleted object data or object data that has been rewritten and stored elsewhere. In some embodiments, the identifying may include receiving a listing of the data blocks in use from the garbage collection operation. For example, the listing of data blocks in use may include an identification of each data block in use, an identification of a data container (extent data chunk) storing the respective data block, and a size of the respective data block. In some embodiments, the extracting may include reading the identified data blocks from one or more server nodes in the cloud storage containing the data blocks based on the received listing and storing the read data blocks in a temporary storage container until enough data blocks have been retrieved to perform erasure coding on the group of data blocks.

In 530, the method may include fragmenting a predetermined amount of extracted object data stored within the data container into erasure coded fragments. For example, the fragmenting may include converting (or breaking-up) the predetermined amount of object data into a plurality of fragments including data fragments storing portions of the data and parity fragments for reconstructing the data in the data fragments. In 540, the method may further include writing the plurality of fragments in a distributed manner among a plurality of storage nodes. For example, the data fragments may include object data from the extracted data blocks, and the parity fragments may include instructions for reconstructing the object data when one or more of the data fragments are lost. In some embodiments, the writing may include distributing the plurality of fragments among a plurality of server nodes within the cloud storage based on instructions from a stream manager of the plurality of server nodes. In some embodiments, the method may further include generating metadata identifying object data stored within the plurality fragments and storing the metadata in one or more of the plurality of fragments.

As another example, a method may include reading object data from data blocks in use and accumulating the object data within a temporary data container. Here, in response to accumulating a predetermined amount of object data within the temporary data container, the method may include erasure coding the object data within the temporary data container. For example, the erasure coding may include generating a plurality of fragments including data fragments storing fragments of object data and parity fragments storing instructions for reconstructing the object data if one or more data fragments are lost, and writing the plurality of fragments in a distributed manner across a plurality of server nodes of the cloud storage.

Figure 6:
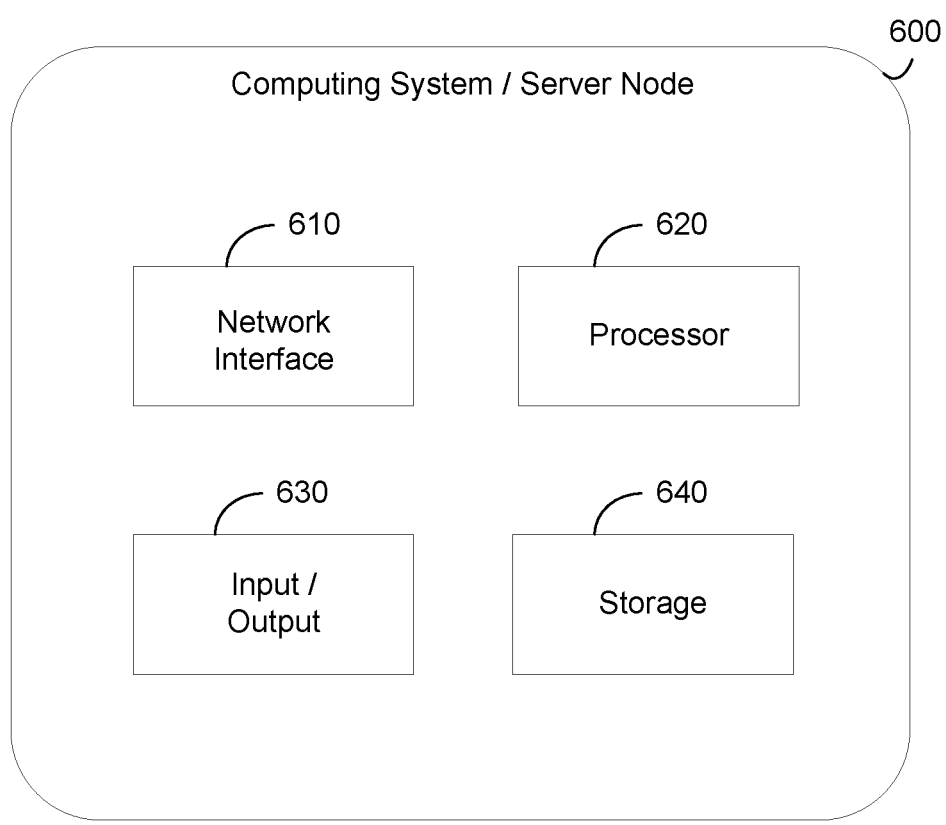
FIG. 6 is a diagram illustrating an example of a computing node architecture according to some embodiments.

FIG. 6 illustrates an example of a computing node architecture 600 according to some embodiments. For example, the computing system 600 may be a server node, a cloud data center, a database, a user device, or the like. In some embodiments, the computing system 600 may be distributed across multiple devices. Referring to FIG. 6, the computing system 600 includes a network interface 610, a processor 620, an input/output 630, and a storage device 640. Although not shown in FIG. 6, the computing system 600 may also include or be electronically connected to other components such as a display, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable.

The input and the output 630 may include interfaces for inputting data to the computing system 600 and for outputting data from the computing system. For example, data may be output to an embedded or an external display, a storage drive, a printer, and the like. For example, the input and the output 630 may include one or more ports, interfaces, cables, wires, boards, and/or the like, with input/output capabilities. The network interface 610, the output 630, or a combination thereof, may interact with applications executing on other devices.

The storage device 640 is not limited to a particular storage device and may include any known memory device such as RAM, ROM, hard disk, object storage, blob storage, and the like, and may or may not be included within the cloud environment. The storage 640 may include partitions of storage and one or more indexes identifying location of stored objects. The storage 640 may store software modules or other instructions which can be executed by the processor 620 to perform the method 500 shown in FIG. 5. Also, according to various embodiments, the storage 640 may store a data container (e.g., an extent) which is capable of receiving and temporarily storing good data objects from other extents.

Referring to FIG. 6, the processor 620 may identify data blocks in use and interspersed among garbage data blocks not in use in cloud storage based on a garbage collection operation. For example, the good data blocks may include object data such as blobs, tables, files, etc., stored in a cloud platform and associated with a user account. The processor 620 may extract object data from the identified data blocks in use into a data container while leaving object data of the garbage data blocks not in use. The processor 620 may fragment a predetermined amount of extracted object data stored within the data container into a plurality of erasure code fragments. The fragmentation may convert the predetermined amount of object data into a plurality of fragments including data fragments storing portions of the data and parity fragments for reconstructing the data in the data fragments in the event of a loss of any of the data fragments. The processor 620 may write the plurality of fragments in a distributed manner among a plurality of storage nodes.

In some embodiments, the processor 620 may receive a listing of the data blocks in use from the garbage collection operation. For example, the listing of data blocks in use may include an identification of each data block in use, an identification of a data container storing the respective data block, and a size of the respective data block. The processor 620 may also read the identified data blocks from one or more server nodes in the cloud storage that contain the data blocks based on the received listing. In some embodiments, the processor 620 may generate metadata that identifies object data stored within the plurality fragments and store the metadata in one or more of the plurality of fragments. In some embodiments, the processor 620 may distribute the plurality of fragments among a plurality of server nodes within the cloud storage based on instructions from a stream manager of the plurality of server nodes.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computing system comprising:
a storage comprising a data container; and
a processor configured to
identify data blocks in use and interspersed among garbage data blocks not in use in cloud storage based on a garbage collection operation,
extract object data from the identified data blocks in use into a data container while leaving object data of the garbage data blocks not in use,
fragment a predetermined amount of extracted object data stored within the data container, wherein the fragmentation converts the predetermined amount of object data into a plurality of fragments including data fragments storing portions of the data and parity fragments for reconstructing the data, and
write the plurality of fragments in a distributed manner among a plurality of storage nodes.

2. The computing system of claim 1, wherein the data blocks in use comprise active object data, and the garbage data blocks not in use comprise deleted object data.

3. The computing system of claim 1, wherein the processor is configured to receive a listing of the data blocks in use from the garbage collection operation.

4. The computing system of claim 3, wherein the listing of data blocks in use comprises an identification of each data block in use, an identification of a data container storing the respective data block, and a size of the respective data block.

5. The computing system of claim 3, wherein the processor is configured to read the identified data blocks from one or more server nodes in the cloud storage that contain the data blocks based on the received listing.

6. The computing system of claim 1, wherein the data fragments comprise object data from the extracted data blocks, and the parity fragments comprise instructions to reconstruct the object data when one or more of the data fragments are lost.

7. The computing system of claim 1, wherein the processor is further configured to generate a list of blocks identifying object data stored within a fragment and store an identification of the list of blocks of the fragment within a stream.

8. The computing system of claim 1, wherein the processor is configured to distribute the plurality of fragments among a plurality of server nodes within the cloud storage based on instructions from a stream manager of the plurality of server nodes.

9. A method comprising:
identifying data blocks in use in cloud storage based on a garbage collection operation;
collecting object data from the identified data blocks in use and storing the collected object data in a data container while ignoring garbage data blocks not in use; and
breaking-up a predetermined amount of object data stored within the data container into a plurality of fragments including data fragments storing portions of the data and parity fragments for reconstructing the data; and
storing the plurality of fragments among a plurality of storage nodes.

10. The method of claim 9, wherein the data blocks in use comprise active object data, and the garbage data blocks not in use comprise deleted object data.

11. The method of claim 9, wherein the identifying comprises receiving a listing of the data blocks in use from the garbage collection operation.

12. The method of claim 11, wherein the listing of data blocks in use comprises an identification of each data block in use, an identification of a data container storing the respective data block, and a size of the respective data block.

13. The method of claim 11, wherein the extracting comprises reading the identified data blocks from one or more server nodes in the cloud storage containing the data blocks based on the received listing.

14. The method of claim 9, wherein the data fragments comprise object data from the identified data blocks, and the parity fragments comprise instructions for reconstructing the object data when one or more of the data fragments are lost.

15. The method of claim 9, further comprising generating a list of blocks identifying object data stored within a fragment and storing an identification of the list of blocks of the fragment within a stream.

16. The method of claim 9, wherein the storing comprises distributing the plurality of fragments among a plurality of server nodes within the cloud storage based on instructions from a stream manager of the plurality of server nodes.

17. A method comprising:
reading object data from data blocks in use and accumulating the object data within a temporary data container;
in response to accumulating a predetermined amount of object data within the temporary data container, erasure coding the object data within the temporary data container, the erasure coding comprising:
generating a plurality of fragments including data fragments storing fragments of object data and parity fragments storing instructions for reconstructing the object data if one or more data fragments are lost, and
writing the plurality of fragments in a distributed manner across a plurality of server nodes of the cloud storage.

18. The method of claim 17, further comprising receiving a list of the data blocks in use, the list comprising an identification of each data block in use, an identification of a data container storing the respective data block, and a size of the respective data block.

19. The method of claim 17, further comprising generating metadata identifying object data stored within the data fragments and storing the metadata in one or more of the data fragments.

20. The method of claim 17, wherein the writing comprises distributing the plurality of fragments among a plurality of server nodes within the cloud storage based on instructions from a stream manager of the plurality of server nodes.

* * * * *